June 6, 1950  C. W. CHILLSON ET AL  2,510,170
PROPELLER BLADE ANTIICING MEANS
Filed Feb. 13, 1946
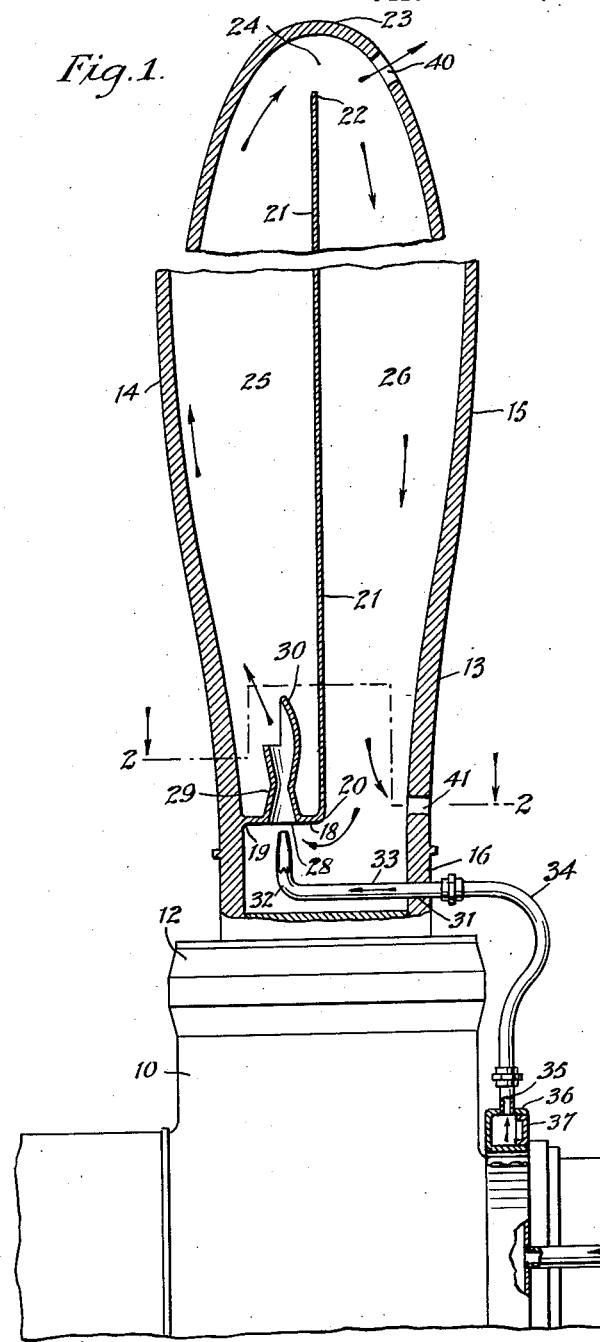
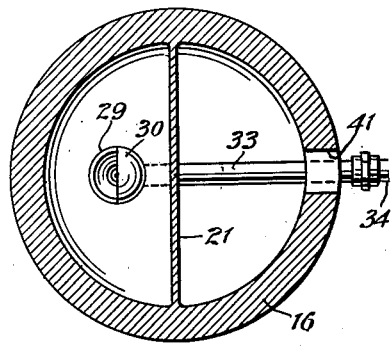
INVENTORS
Everett P. Palmatier
Charles W. Chillson
BY
Godfrey B. Speir
ATTORNEY Patented June 6, 1950

2,510,170

UNITED STATES PATENT OFFICE 2,510,170

PROPELLER BLADE ANTIICING MEANS

Charles W. Chillson, Caldwell, N. J., and Everett P. Palmatier, Solvay, N. Y., assignors to Curtiss-Wright Corporation, a corporation of Delaware Application February 13, 1946, Serial No. 647,248

7 Claims. (Cl. 244—134)

This invention relates to means for removing ice from, or preventing the formation of ice on, elements of aircraft which are exposed to an icing atmosphere. More particularly, the invention concerns improvements in de-icing systems for aircraft propeller blades.

The prior art has revealed various systems for circulating a hot gaseous medium through hollow portions of aircraft elements such as wings and propeller blades. Such systems have contemplated the use either of hot air or hot exhaust gas from the aircraft power plants and usually provide for the direct admission of the hot gas to the aircraft element, the hot gas flowing along or across the element and issuing therefrom through suitable openings after the gas has been in heat transfer relationship with the inner surfaces of the aircraft element. While the present invention comes within the general scope of above described systems, it provides improvements whereby the hot gaseous medium may be recirculated in the aircraft element to give up a larger amount of heat to the surface of the element, thereby reducing the wastage of heat occurring in most of the prior systems.

It is an object of this invention to reduce the amount of hot gas fed to an aircraft element for de-icing purposes while still retaining effective de-icing of the element. By reducing the amount of hot gas used for de-icing, the bulk and weight of the heat transfer apparatus from which the hot medium is secured may be reduced, and also the extra aerodynamic drag resulting from the issue of large amounts of spent de-icing gas to the atmosphere may be reduced.

It is a further object of the invention to provide a recirculating de-icing system which is particularly adaptable for use with hollow aircraft propellers and with other aircraft elements.

Further objects of the invention will become apparent in reading the detailed description following in connection with the drawings in which Fig. 1 is a side elevation of a portion of an aircraft propeller, showing the propeller blade in longitudinal section, and Fig. 2 is a section on the line 2—2 of Fig. 1.

While a propeller and blade has been chosen as an example for the application of the principles of our invention, it will be obvious to those skilled in the art that the principles may be applied equally well to the other aircraft components such as wings, tail surfaces, and fuselage components.

We show a propeller hub 10 which is mounted in conventional fashion on a portion of aircraft structure 11, the propeller hub being driven in the conventional manner by a prime mover within the aircraft. The propeller hub includes a plurality of blade sockets one of which is shown at 12 and from which extends a propeller blade 13 which is a hollow structure. The blade such as 13 is well known in the art and usually consists of thrust and camber plates secured to one another at their leading and trailing edges such as 14 and 15 respectively, the blade having an airfoil cross-section throughout the major portion of its length and terminating at its inner end in a cylindrical shank portion 16 which is secured within the hub socket 12 for pitch changing movement.

Within the propeller blade we provide a partition 18, near the shank portion of the blade, which bridges the space between the thrust and camber plates and extends from the leading edge, as at 19, to a mid-portion of the blade as at 20, substantially midway between the leading and trailing edges. A second partition portion 21, contiguous with the first, extends from the point 20 longitudinally of the blade to a point 22 a short distance inboard of the propeller blade tip 23 to provide a passage 24 around the end of the partition 21 and within the propeller blade hollow. The partition 21, like the partition 18, joins the thrust and camber surfaces of the blade. It defines cavities 25 and 26 extending longitudinally within the blade hollow and respectively adjacent the leading and trailing edge portions 14 and 15 of the propeller blade.

In the partition 18 we provide an opening 28 and secured over this opening, within the cavity 25, is a Venturi tube 29 whose axis is substantially parallel to the longitudinal axis of the blade and to the leading edge of the blade. This venturi, at its outer end, may be provided with a deflector 30 so that gas passing through the venturi 29 is deflected along the inner surface of the leading edge of the blade.

Coaxial with the Venturi tube 29, and inboard thereof, is a nozzle 32 forming the end of a tube 33 which passes through the trailing edge portion of the propeller blade as at 31, said tube 33 being connected by means of a flexible heat resisting hose 34 to a nipple 35 secured to an annular gas transfer channel 36 secured to the propeller hub. Said channel at its rear open end is fitted with an annular plate 37, non-rotatably secured to the aircraft structure, into which leads a pipe 38 which is fed by an appropriate source of high temperature gas.

As high temperature gas passes through the elements 38, 36, 35, 34 and 33, it issues from the nozzle 32 in the form of a high speed jet and thence passes on through the venturi 29, carrying with it hot gas which is already in cavities 25 and 26 for recirculation of said gas through the circuit established by the cavity 25, the tip passage 24, the cavity 26 and the Venturi tube 29. The hot gas from the nozzle is somewhat diluted by the gas already within the propeller and is thus reduced in temperature but passes in large volume at moderate speed along the interior propeller blade surfaces whereby it imparts the heat energy in the gas to the propeller blade surfaces to raise them to such temperature that ice accretions on the exterior surfaces of the blade will be melted, or to a point, if ice has not formed, where the formation of such ice will be prevented.

Ports such as 40 and 41 are provided in the propeller blade to allow the outflow of recirculating gas in an amount substantially equal to the new hot gas delivered to the propeller hollow by the nozzle 32. Preferably, the ports 40 and 41 are located toward the trailing edge of the propeller and at a point within the propeller where the gas therein is lower in temperature.

While we have described our invention in detail in its present preferred enbodiment, it will be obvious to those skilled in the art, after understanding our invention, that various changes and modifications may be made therein without departing from the spirit or scope thereof. We aim in the appended claims to cover all such modifications and changes.

What is claimed is:

1. In a de-icing system for a propeller having hollow blades, each of said blades having a partition dividing the blade hollow into a leading edge cavity and a trailing edge cavity, means establishing communication between said cavities toward the tip end of the blade, a duct directed toward the leading edge interior surface, communicating at one end with the trailing edge cavity and at its other end with the leading edge cavity, a nozzle directed into said duct toward the leading edge cavity, means to supply a hot gaseous medium for flow through said nozzle, and an exit duct in said blade for the issue of spent and surplus medium therefrom.

2. In a de-icing system for a propeller having hollow blades, each of said blades having a partition dividing the blade hollow into a leading edge cavity and a trailing edge cavity, means establishing communication between said cavities toward the tip end of the blade, a duct directed toward the leading edge interior surface, communicating at one end with the trailing edge cavity and at its other end with the leading edge cavity, a nozzle directed into said duct toward the leading edge cavity, means to supply a hot gaseous medium for flow through said nozzle, and said blade having an outlet remote from said duct and nozzle for exit of spent gaseous medium from the blade.

3. In a hollow propeller blade for use in an aircraft propeller, a partition extending lengthwise of the blade from a point inboard of the tip to a point outboard of the blade butt, an injector tube between the partition and the leading edge portion of the blade and sealed relative to the partition and inner surface of the blade, a nozzle directed toward said injector tube, said blade having an opening from its hollow to the outside at a point remote from the injector tube, and means to feed a hot gaseous medium to said nozzle, for delivery therefrom through said injector tube into the leading edge portion of said blade hollow.

4. In a hollow propeller blade for use in an aircraft propeller, a partition extending lengthwise of the blade from a point inboard of the tip to a point outboard of the blade butt, an injector tube between the partition and the leading edge portion of the blade and sealed relative to the partition and inner surface of the blade, a nozzle directed toward said injector tube, said blade having an opening from its hollow to the outside at a point remote from the injector tube, means to feed a hot gaseous medium to said nozzle, for delivery therefrom through said injector tube into the leading edge portion of said blade hollow, and said injector tube having a deflector for guiding medium issuing therefrom longitudinally along the interior surface of the blade adjacent its leading edge.

5. In a propeller, in combination, a plurality of hollow blades, a gas transfer ring having a part rotatable with the propeller and a stationary part, means to feed hot gas to said stationary part, ducts from said rotatable part leading into the hollows of said blades, each having a nozzle for directing the gas outwardly along the blade leading edge interior surface, an injector tube adjacent each nozzle through which said nozzle injects gas, partition means within each blade defining a recirculating path for hot gas through said injector tube and substantially around the periphery of the blade hollow, and an exit duct in said blade for the issue of spent and surplus gas therefrom.

6. In a hollow propeller blade, a partition joining the thrust and camber blade plates, extending from the leading edge rearwardly to a point substantially midway between the leading and trailing edges, said partition being disposed toward the shank end of the blade and having a Venturi tube extending therefrom with its axis substantially paralled to the blade leading edge, a second partition contiguous with the first extending outwardly toward, but terminating short of, the blade tip, said second partition joining the thrust and camber blade plates substantially midway between the blade leading and trailing edges, a nozzle in the blade hollow coaxial with said Venturi tube and pointing toward it, and means to feed a hot gas to said nozzle for exit therefrom, said blade having an opening therein, remote from said tube and nozzle, for efflux of gas from the blade hollow.

7. In a propeller de-icing system, a hollow propeller blade having means therein defining a vented recirculating flow circuit for a de-icing medium, means in the blade for admitting a fresh stream of high temperature de-icing medium to said flow circuit to augment and mix with the medium existing in said circuit and to enforce circulation thereof in said circuit, the vent in said circuit serving to vent spent and surplus medium from said circuit to the atmosphere during the recirculation of the medium.

CHARLES W. CHILLSON.
EVERETT P. PALMATIER.

REFERENCES CITED

The following references are of record in the file of this patent:

UNITED STATES PATENTS

| Number | Name | Date |
|---|---|---|
| 2,264,297 | Clay | Dec. 2, 1941 |

FOREIGN PATENTS

| Number | Country | Date |
|---|---|---|
| 577,905 | Great Britain | Dec. 10, 1943 |